July 13, 1954     D. G. GRISWOLD     2,683,580
PILOT CONTROLLED MULTIPLE DIAPHRAGM VALVE
Filed March 3, 1950     2 Sheets-Sheet 1

Inventor
Donald G. Griswold
By Bacon & Thomas
Attorneys

July 13, 1954  D. G. GRISWOLD  2,683,580
PILOT CONTROLLED MULTIPLE DIAPHRAGM VALVE
Filed March 3, 1950  2 Sheets-Sheet 2

Inventor
Donald G. Griswold
By Bacon & Thomas
Attorneys

UNITED STATES PATENT OFFICE 2,683,580

PILOT CONTROLLED MULTIPLE DIAPHRAGM VALVE

Donald G. Griswold, San Marino, Calif.

Application March 3, 1950, Serial No. 147,380

10 Claims. (Cl. 251—31)

The present invention relates to valves and more particularly to a pilot-controlled, fluid pressure operated main valve including two diaphragms arranged in tandem and connected with a single valve stem.

The principal object of the invention is to provide a fluid pressure operated valve wherein a great force can be made available for effecting quick closing of the valve against line pressure, without requiring the use of a diaphragm of unconventionally large diameter compared with the size of the valve.

Another object of the invention is to provide a fluid pressure operated valve in which fluid pressure can be rendered available to assist line pressure in effecting quick opening of the valve and/or in maintaining the valve in full open position.

Another object of the invention is to provide remote control means for controlling the operation of a multiple diaphragm, fluid pressure operated valve in which the arrangement of the control means with respect to the valve is such that failure of either of the diaphragms can be detected by leakage discharging from the remote control means when the valve is either wide open or fully closed.

A further object of the invention is to provide a fluid pressure operated main valve and a pilot valve for controlling the opening and closing of said main valve, wherein the extent of opening, and consequently the rate of flow of liquid through the main valve, can be varied at will.

A still further object of the invention is to provide a fluid pressure operated valve whose valve disc and valve stem can be hydraulically "locked" in any desired position of adjustment.

Figure 1:
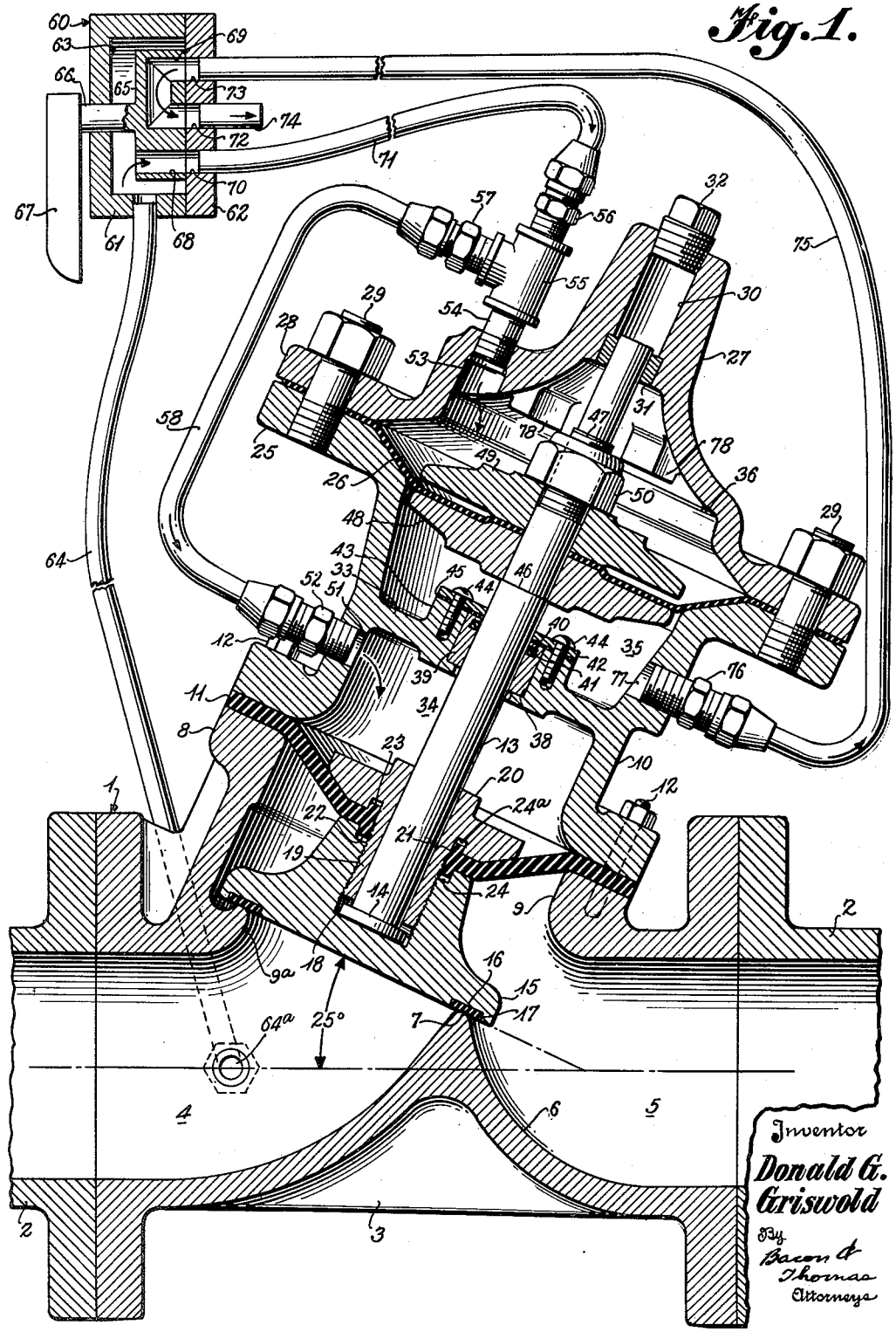
Figure 2:
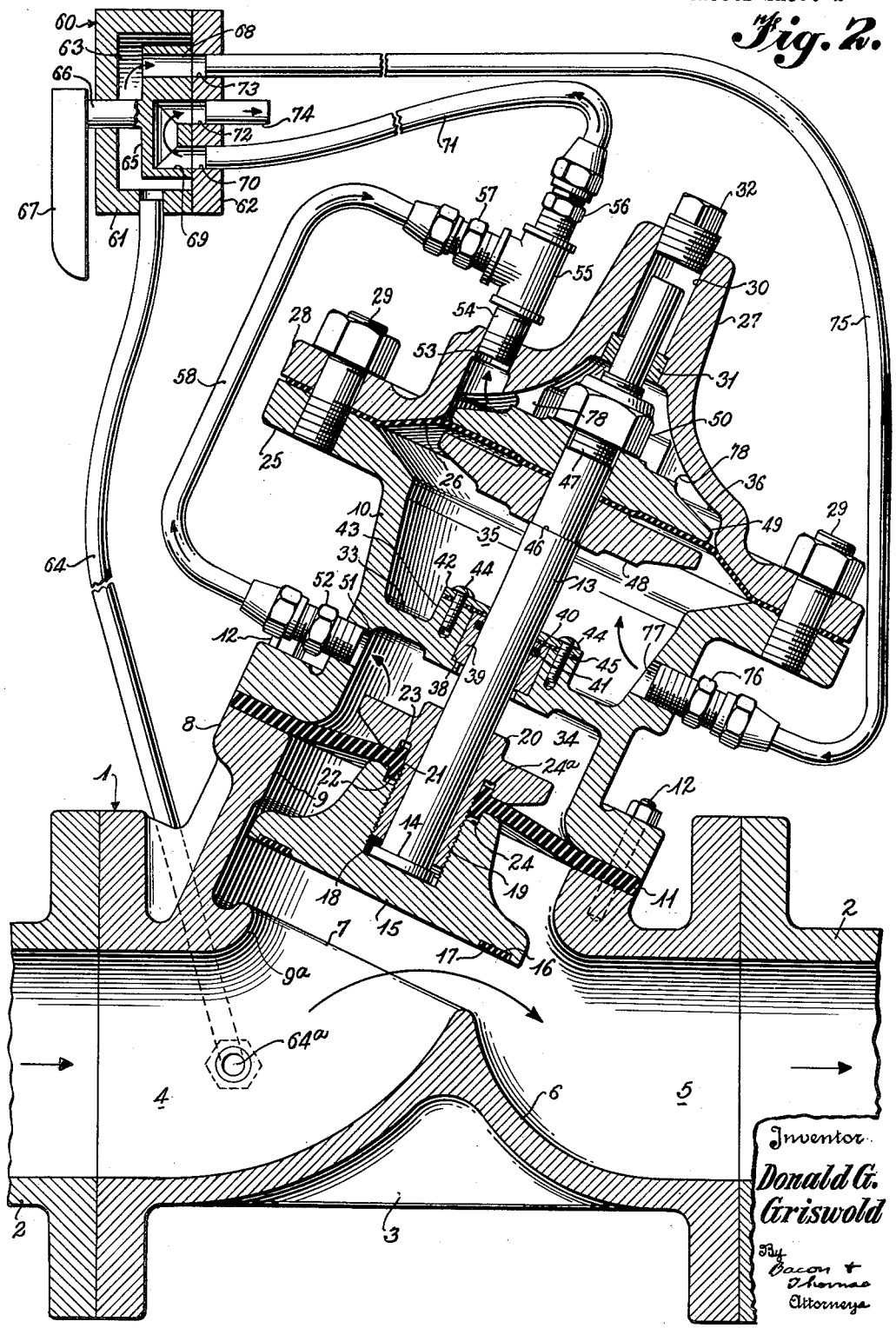

Other objects and features of the invention will be apparent from the following description taken in conjunction with the accompanying drawings, in which:

Fig. 1 is a longitudinal sectional view through a fluid pressure operated main valve embodying the principles of the present invention, and in which the pilot valve is diagrammatically illustrated in a position corresponding to the closed position of the main valve; and Fig. 2 is a similar view but illustrating the main valve in its full open position with the parts of the pilot valve diagrammatically illustrated in a corresponding position.

Referring now to the drawings, the numeral 1 generally identifies the fluid pressure operated main valve, which is shown connected in a pipe line 2. The main valve 1 includes a body portion 3 having an inlet chamber 4, an outlet chamber 5 and a partition wall 6 disposed between said chambers. The inlet chamber 4 is in the form of an arcuate passageway which terminates in a round-edged valve seat 7 formed on the partition wall 6, said seat being inclined in the direction of normal flow at an angle of about 25° to a horizontal line passing through the center of the chambers 4 and 5. The inclination of the valve seat 7 in the direction of flow reduces frictional resistance to the flow of liquid through the main valve 1.

The valve body 3 has a cylindrical upper portion 8 forming an opening 9 above and in generally aligned relation with the opening 9ª in the seat 7. An intermediate section 10 is disposed above the cylindrical portion 8 and the outer marginal portion of a flexible diaphragm 11 is disposed between the cylindrical portion 8 of the valve body 3 and the valve section 10. The diaphragm 11 may be made of rubber or any other suitable material. A plurality of stud bolts 12 exert clamping pressure on the diaphragm 11 and secure the intermediate section 10 in assembled relation with the valve body 3.

A slidable valve stem 13 is disposed substantially perpendicular to the plane of the valve seat 7 and is provided with an enlargement 14 at its lower end. A valve disc 15 has an imperforate lower face provided with a groove 16 for the reception of a sealing ring 17 adapted to engage the rounded edge of the valve seat 7 in fluid-tight relation. The valve disc 15 is provided with a threaded bore 18 for the reception of an externally threaded tubular extension 19 projecting from a clamping member 20 disposed in surrounding relation to the valve stem 13. The diaphragm 11 has an opening 21 through which the sleeve 19 extends and is provided with flanges 22 and 23 surrounding the opening 21 on both the upper and lower sides of said diaphragm. The flange 22 is disposed in a recess 24 formed in the upper end of the valve disc 15 and the flange 23 is received in a recess 24ª formed in the clamping member 20. Thus, it will be apparent that, when the sleeve portion 19 of the clamping member is threaded into the bore 18 of the valve disc 15, the flanged inner marginal portion of the diaphragm 11 will be clamped in fluid-tight relation between the clamping member 20 and the valve disc 15 and thereby prevent leakage of liquid along the valve stem 13 from the valve body 3 into the intermediate section 10. The enlargement 14 at the lower end of the valve stem 13 is disposed in the bore 18 below the lower end of the sleeve 19 so that the valve disc 15 is maintained in assembled relation with said valve stem and any movement imparted to the valve stem 13 will necessarily result in corresponding movement of the valve disc 15.

The upper end of the intermediate section 10 is provided with an outwardly extending flange 25 whose upper surface is engaged by one side of a flexible diaphragm 26 at the outer marginal portion of said diaphragm. A cover member 27 is provided with a similar flange 28 having its lower face engaging the opposite side of said diaphragm. The diaphragm 26 may be made of rubber or any other suitable material. The diaphragm 26 is tightly clamped between the flanges 25 and 28, and the intermediate section 10 and the cover 27 are secured together in assembled relation, by a plurality of stud bolts 29. The cover member 27 has a passageway 30 containing a bushing 31 at its lower end serving as a guide for the upper end of the valve stem 13. The outer end of the passageway 30 is threaded and closed by a plug 32.

The intermediate section 10 has a transverse wall 33 disposed in a plane approximately midway of its height and forms a chamber 34 above the diaphragm 11 and a chamber 35 below the diaphragm 26. The cover member 27 is formed hollow to provide a chamber 36 above the diaphragm 26. The transverse wall 33 has a counterbore 38 in which a bushing 39 is disposed for guiding the lower portion of the valve stem 13. An O ring-type of sealing member 40 is disposed in a groove 41 formed in the bushing 39 and serves to prevent leakage of liquid along the valve stem 13 between the chambers 34 and 35. The bushing 39 is retained in place by a plate 42 secured to a boss 43 on the wall 33 by a plurality of screws 44, a gasket 45 being interposed between said plate and said boss.

The valve stem 13 has a shoulder 46 and a threaded portion 47 disposed above said shoulder. The diaphragm 26 has a central opening through which the valve stem 13 extends and a diaphragm clamping member 48 is disposed below said diaphragm and a similar clamping member 49 is disposed above said diaphragm, a nut 50 being threaded upon the portion 47 of said valve stem to urge the clamping member 48 against the shoulder 46 and to tightly clamp the diaphragm 26 between the clamping members 48 and 49.

The intermediate section 10 has an opening 51 communicating with the chamber 34. The opening 51 may be utilized to connect the chamber 32 directly with the atmosphere at all times, if desired. However, certain advantages can be gained by utilizing said chamber as a pressure chamber and to this end a conventional fitting 52 is mounted in the opening 51. The cover member 27 has an opening 53 in which one end of a pipe nipple 54 is mounted. A pipe-T 55 has one side thereof mounted upon the pipe nipple 54 and a conventional fitting 56 is mounted in the other end of said pipe-T. A conventional fitting 57 is mounted in the stem of the pipe-T 55 and a conduit 58 connects the fitting 57 with the fitting 52, thus interconnecting the chamber 36 with the chamber 34 for a purpose which will become apparent later.

A pilot valve 60 is schematically shown in the drawings and includes a housing 61 and a base 62. The housing 61 is provided with a pressure chamber 63 and a conduit 64 communicates with the pressure chamber 63 and is adapted to supply operating fluid, either air or liquid, to said chamber from any suitable source. For convenience, the conduit 64 may be connected with the inlet chamber 4 of the main valve 1, as shown at 64$^a$, so that the liquid in the pipe line 2 can be used to effect hydraulic control of the main valve 1. A rotatable pilot disc 65 is disposed in the pressure chamber 63 and has one end of a shaft 66 suitably connected thereto, a knob 67 being connected with the other end of said shaft in order to provide for manual operation of the pilot disc 65.

The pilot disc 65 contains a pressure port 68 and a generally U-shaped exhaust port 69. The base 62 has a port 70 connected by a conduit 71 with the fitting 56, whereby the pilot valve 60 is interconnected with the chambers 34 and 36. The base 62 has two additional ports 72 and 73, shown interconnected in Fig. 1 by the exhaust port 69. A drain or exhaust conduit 74 is connected with the port 72 for discharge to the atmosphere, and a conduit 75 has one end thereof connected with the port 73 and its other end connected with a conventional fitting 76 mounted in a threaded opening 77 formed in the intermediate section 10, so that communication between the pilot valve 60 and the chamber 35 is established. The opening 77 may simply be vented directly to the atmosphere, if desired, instead of being connected with the pilot valve 60, but an operating advantage is obtained by connecting the chamber 35 with said pilot valve to make fluid pressure available for effecting quick opening of the valve, as will be explained hereinafter. In certain installations, the chambers 35 and 36 only will be connected by the conduits 75 and 71 with the pilot valve 60, and the chamber 34 vented at all times to the atmosphere through the opening 51. Thus, the diaphragm 26 can be used alone as a means for effecting opening and closing of the main valve 1.

It will be apparent from Fig. 1 that when the pilot disc 65 is in the position illustrated, operating fluid under pressure can flow from the pressure chamber 63 of the pilot valve 60 through the port 68 in the pilot disc 65, through the port 70 in the base 62, and the conduits 71 and 58 to the chambers 36 and 34, respectively, to simultaneously apply pressure to the upper side of the diaphragms 11 and 26, respectively, to maintain the valve stem 13 and valve disc 15 in a down position to cut off flow through the main valve 1. It will also be apparent that the chamber 35 at the lower side of the diaphragm 26 is not subjected to fluid pressure at this time in view of the fact that the conduit 75 is connected to the atmosphere through the base port 73, pilot exhaust port 69, base port 72, and exhaust conduit 74.

Should any leakage occur from either chamber 34 or 36 into the chamber 35 when the main valve 1 is fully closed, such leakage will discharge through the conduit 74 and thus indicate malfunctioning of said main valve.

It will also be apparent that when the main valve 1 is in its closed position, fluid pressure is effective upon both of the diaphragms 11 and 26 for maintaining said valve closed. Each of the diaphragms 11 and 26 has an effective area sufficient in itself to effect closing of the valve 1 when pressure fluid is applied to the upper side thereof. Thus, in the event of failure of either diaphragm, the other would be effective to close the valve. Normally, however, pressure will simultaneously be effective on both diaphragms to close the main valve 1, and in view of the fact that the pressure fluid is acting upon the effective area of both diaphragms 11 and 26 the closing force is at least doubled, compared with a conventional single diaphragm valve, so that the line pressure is rapidly overcome and the valve 1 more quickly closed than would be the case if only one diaphragm were employed. The valve structure is thus kept to a minimum in size and at the same time additional features of value are obtained by the tandem diaphragm arrangement.

It will be apparent that, when the pilot valve disc 65 is moved to the position illustrated in Fig. 2, the chambers 34 and 36 are vented to the atmosphere and spent operating fluid is exhausted therefrom through conduits 58 and 71, the base port 70, the pilot disc exhaust port 69, the base port 72, and the exhaust conduit 74. Simultaneously, the pressure port 68 lies in registration with the base port 73 and fluid under pressure is conducted from the pressure chamber 63, through the conduit 75, to the chamber 35 at the lower side of the diaphragm 26, so that fluid under pressure is effective on the lower side of said diaphragm to assist the line pressure in causing upward movement of the valve stem 13 and movement of the valve disc 15 away from the seat 7 to permit flow through the main valve 1. The application of pressure to the lower side of the diaphragm 26 results in quicker opening action of the main valve than would otherwise occur. The opening movement of the main valve 1 is limited by engagement of the clamping member 49 with abutments 78 formed on the inner side of the cover member 27. Inasmuch as the chambers 34 and 36 are now open to the atmosphere, any discharge from the exhaust conduit 74, after the main valve has been full opened, will be indicated by the discharge of leakage from said exhaust conduit. Thus, with the present valve arrangement, a leakage condition can be detected when the main valve 1 is either fully opened or fully closed.

It will be apparent that the valve disc 15 can be hydraulically "locked" in any position between "closed" and "wide open" by simply positioning the pilot disc 65 so that the ports 68 and 69 thereof are not in registration with either base port 70 or 73. At such time, operating fluid can neither flow into nor exhaust from any of the chambers 34, 35 and 36 of the main valve 1. Hence, the valve stem 13 can be maintained stationary in any desired position of adjustment.

It will be understood that various changes may be made in the details of construction and in the arrangement of the main valve and pilot valve disclosed herein, without departing from the spirit of the invention or the scope of the annexed claims.

I claim:

1. A fluid pressure operated valve, comprising: a valve body having inlet and outlet chambers and a valve seat between said chambers, an intermediate section, and a cover member; a first diaphragm between said cover member and intermediate section; a second diaphragm between said intermediate section and valve body; a valve stem extending from said valve body into said cover member; a valve disc in said valve body engageable with said valve seat and connected with said valve stem; means connecting said diaphragms with said valve stem, said cover member being hollow to provide a first chamber above said first diaphragm and said intermediate section having a transverse wall extending thereacross between said diaphragms and surrounding said valve stem and providing a second chamber below said first diaphragm and a third chamber above said second diaphragm; and means including a valve element for simultaneously admitting operating fluid under pressure into said first and third chambers and exhausting operating fluid from said second chamber to effect closing of said valve and for admitting operating fluid under pressure into said second chamber and simultaneously exhausting operating fluid from said first and third chambers to effect opening of said valve.

2. A fluid pressure operated valve, comprising: a valve body having inlet and outlet chambers and a seat between said chambers, an intermediate section, and a cover member; a first diaphragm between said cover member and intermediate section; a second diaphragm between said intermediate section and valve body, a valve stem extending from said valve body into said cover member; a valve disc in said valve body engageable with said valve seat and connected with the lower end of said valve stem; means connecting said diaphragms with said valve stem, said cover member being hollow to provide a first chamber above said first diaphragm and said intermediate section having a transverse wall extending thereacross between said diaphragms and surrounding said valve stem and providing a second chamber below said first diaphragm and a third chamber above said second diaphragm; means for simultaneously admitting operating fluid under pressure into said first and third chambers to effect closing of said valve; and means venting said second chamber to the atmosphere to betray liquid leakage from either said first of third chambers into said second chamber.

3. A fluid pressure operated valve, comprising: a valve body having inlet and outlet chambers and a valve seat between said chambers, an intermediate section, and a cover member; a first diaphragm between said cover member and intermediate section; a second diaphragm between said intermediate section and valve body; a valve stem extending from said valve body into said cover member; a valve disc in said valve body engageable with said valve seat and connected with the lower end of said valve stem; means connecting said first diaphragm with said valve stem; means connecting said second diaphragm with said valve disc, said cover member being hollow to provide a first chamber above said first diaphragm, said intermediate section having a transverse wall extending thereacross between said diaphragms and providing a second chamber below said first diaphragm, and a third chamber above said second diaphragm; and means including a valve element for admitting operating fluid under pressure into said first chamber and exhausting operating fluid from said second chamber to effect closing of the valve against line pressure, and for exhausting operating fluid from said first chamber and admitting operating fluid into said second chamber to aid line pressure in effecting opening of the valve.

4. A fluid pressure operated valve device, comprising: a main valve including a valve body having inlet and outlet chambers and a seat between said chambers, an intermediate section, and a cover member; a first diaphragm between said cover member and intermediate section; a second diaphragm between said intermediate section and valve body, a valve stem extending from said valve body into said cover member; a valve disc in said valve body engageable with said valve seat and connected with the lower end of said valve stem; means connecting said diaphragms with said valve stem, said cover member being hollow to provide a first chamber above said first diaphragm and said intermediate section having a transverse wall extending thereacross between said diaphragms and surrounding said valve stem and providing a second chamber below said first diaphragm and a third chamber above said second diaphragm; and a pilot valve including a pilot disc and conduit means for simultaneously admitting operating fluid under pressure into said first and third chambers and exhausting operating fluid from said second chamber to effect closing of said main valve against line pressure, and for simultaneously admitting operating fluid under pressure into said second chamber and exhausting operating fluid from said first and third chambers to effect opening of said main valve.

5. A fluid pressure operated valve, comprising: a valve body having inlet and outlet chambers and a valve seat between said chambers inclined on a sufficient angle to the horizontal to minimize frictional resistance to the flow of liquid through said valve, an intermediate section, and a cover member; a first diaphragm between said cover member and intermediate section; a second diaphragm between said intermediate section and valve body; a valve stem arranged perpendicular to said valve seat and extending from said valve body into said cover member; a valve disc in said valve body engageable with said valve seat and carried by the lower end of said valve stem; means connecting said first diaphragm with said valve stem; means connecting said second diaphragm with said valve disc, said cover member being hollow to provide a first chamber above said first diaphragm, and said intermediate section having a transverse wall extending thereacross between said diaphragms and providing a second chamber below said first diaphragm and a third chamber above said second diaphragm; and remote control means including a valve element for simultaneously admitting operating fluid under pressure into said first and third chambers and exhausting operating fluid from said second chamber and for simultaneously exhausting operating fluid from said first and third chambers and admitting operating fluid into said second chamber to effect closing and opening of said valve, respectively, at will.

6. A fluid pressure operated valve, comprising: a valve body having inlet and outlet chambers and a valve seat between said chambers inclined on an angle of about 25° to the horizontal, an intermediate section, and a cover member; a first diaphragm between said cover member and intermediate section; a second diaphragm between said intermediate section and valve body; a valve stem arranged perpendicular to said valve seat and extending from said valve body into said cover member; a valve disc in said valve body engageable with said valve seat and connected with said valve stem; means connecting said first diaphragm with said valve stem; means connecting said second diaphragm with said valve disc, said cover member being hollow to provide a first chamber above said first diaphragm, and said intermediate section having a transverse wall extending thereacross between said diaphragms and providing a second chamber below said first diaphragm and a third chamber above said second diaphragm; and means including a valve element for simultaneously admitting operating fluid under pressure into said first and third chambers and exhausting operating fluid from said second chamber to effect closing of said valve, and for simultaneously exhausting operating fluid from said first and third chambers and admitting operating fluid under pressure into said second chamber to permit opening of said valve.

7. A fluid pressure operated valve, comprising: a valve body having inlet and outlet chambers and a valve seat between said chambers, an intermediate section, and a cover member; a first diaphragm between said cover member and intermediate section; a second diaphragm between said intermediate section and valve body; a valve stem extending from said valve body into said cover member; a valve disc in said valve body engageable with said valve seat and connected with the lower end of said valve stem; means connecting said first diaphragm with said valve stem; means connecting said second diaphragm with said valve disc, said cover member being hollow to provide a first chamber above said first diaphragm and having a bushing therein forming a guide for the upper end of said valve stem, said intermediate section having a transverse wall extending thereacross between said diaphragm and providing a second chamber below said first diaphragm, and a third chamber above said second diaphragm; a guide bushing carried by said transverse wall forming a guide for the lower portion of said valve stem; sealing means carried by said last-mentioned bushing providing a seal between said bushing and said valve stem; conduit means interconnecting said first and third chambers; and means including a valve element for admitting operating fluid under pressure into said conduit for flow into said first and third chambers and for simultaneously exhausting operating fluid from said second chamber to effect closing of said valve against line pressure and for simultaneously exhausting operating fluid from said first and third chambers and admitting operating fluid under pressure into said second chamber to permit opening of said valve.

8. A fluid pressure operated valve device, comprising: a main valve including a valve body having inlet and outlet chambers and a valve seat between said chambers, an intermediate section, and a cover member; a first diaphragm between said cover member and intermediate section; a second diaphragm between said intermediate section and valve body; a valve stem extending from said valve body into said cover; a closure element carried by said valve stem and engageable with said valve seat for preventing flow of fluid through said valve body; means connecting said diaphragms with said valve stem, said cover member being hollow to provide a first chamber above said first diaphragm and said intermediate section having a transverse wall extending thereacross between said diaphragms and surrounding said valve stem and providing a second chamber below said first diaphragm and a third chamber above said second diaphragm; a pilot valve comprising a housing having a pressure chamber therein for operating fluid under pressure; a pilot disc in said pressure chamber; a first conduit interconnecting said pilot valve with said first and third chambers and a second conduit interconnecting said pilot valve with said second chamber, said pilot valve disc being ported and having one operative position in which operating fluid under pressure is admitted through said first conduit simultaneously to said first and third chambers and operating fluid is exhausted through said second conduit from said second chamber to effect quick closing of said main valve against line pressure, said ported pilot disc having another operative position in which operating fluid is exhausted through said first conduit from said first and third chambers and operating fluid under pressure is admitted through said second conduit into said second chamber to assist line pressure in effecting quick opening of said main valve.

9. A fluid pressure operated valve device, comprising: a main valve including a valve body having inlet and outlet chambers and a valve seat between said chambers inclined on an angle of about 25° to the horizontal, an intermediate section, and a cover member; a first diaphragm between said cover member and intermediate section; a second diaphragm between said intermediate section and valve body; a reciprocable valve stem disposed perpendicular to said valve seat and extending from said valve body into said cover; a closure element carried by said valve stem and engageable with said valve seat for preventing flow of fluid through said valve body; means connecting said diaphragms with said valve stem, said cover member being hollow to provide a first chamber above said first diaphragm and said intermediate section having a transverse wall extending thereacross between said diaphragms and surrounding said valve stem and providing a second chamber below said first diaphragm and a third chamber above said second diaphragm; a pilot valve comprising a housing having a pressure chamber therein for operating fluid under pressure; a pilot disc in said pressure chamber; a first conduit interconnecting said pilot valve with said first and third chambers and a second conduit interconnecting said pilot valve with said second chamber, said pilot valve disc being ported and having one operative position in which operating fluid under pressure is admitted through said first conduit simultaneously to said first and third chambers and operating fluid is exhausted through said second conduit from said second chamber to effect quick closing of said main valve against line pressure, said ported pilot disc having another operative position in which operating fluid is exhausted through said first conduit from said first and third chambers and operating fluid under pressure is admitted through said second conduit into said second chamber to assist line pressure in effecting quick opening of said main valve.

10. A fluid pressure operated valve device as defined in claim 4, in which the operating fluid under pressure is a liquid, and in which the pilot disc is ported and engaged with a ported seat for controlling the admission and exhaust of operating liquid into and from the first, second and third chambers, said pilot disc being manually adjustable at all times relative to said seat to a position in which its ports are in nonregistration with the seat ports to block all flow of operating liquid to and from said first, second and third chambers, whereby the valve disc can be positively held in any desired intermediate position between its wide open and fully closed positions.

References Cited in the file of this patent

UNITED STATES PATENTS

| Number | Name | Date |
|---|---|---|
| 178,965 | Sellers | June 20, 1876 |
| 1,528,074 | Ralston | Mar. 3, 1925 |
| 2,098,696 | Sparrow | Nov. 9, 1937 |
| 2,312,191 | Reader | Feb. 23, 1943 |
| 2,381,799 | Berkholder | Aug. 7, 1945 |
| 2,447,408 | Griswold | Aug. 17, 1948 |